(No Model.)  4 Sheets—Sheet 1.
E. TURNELL.
CORN PICKER AND HUSKER.
No. 596,192. Patented Dec. 28, 1897.
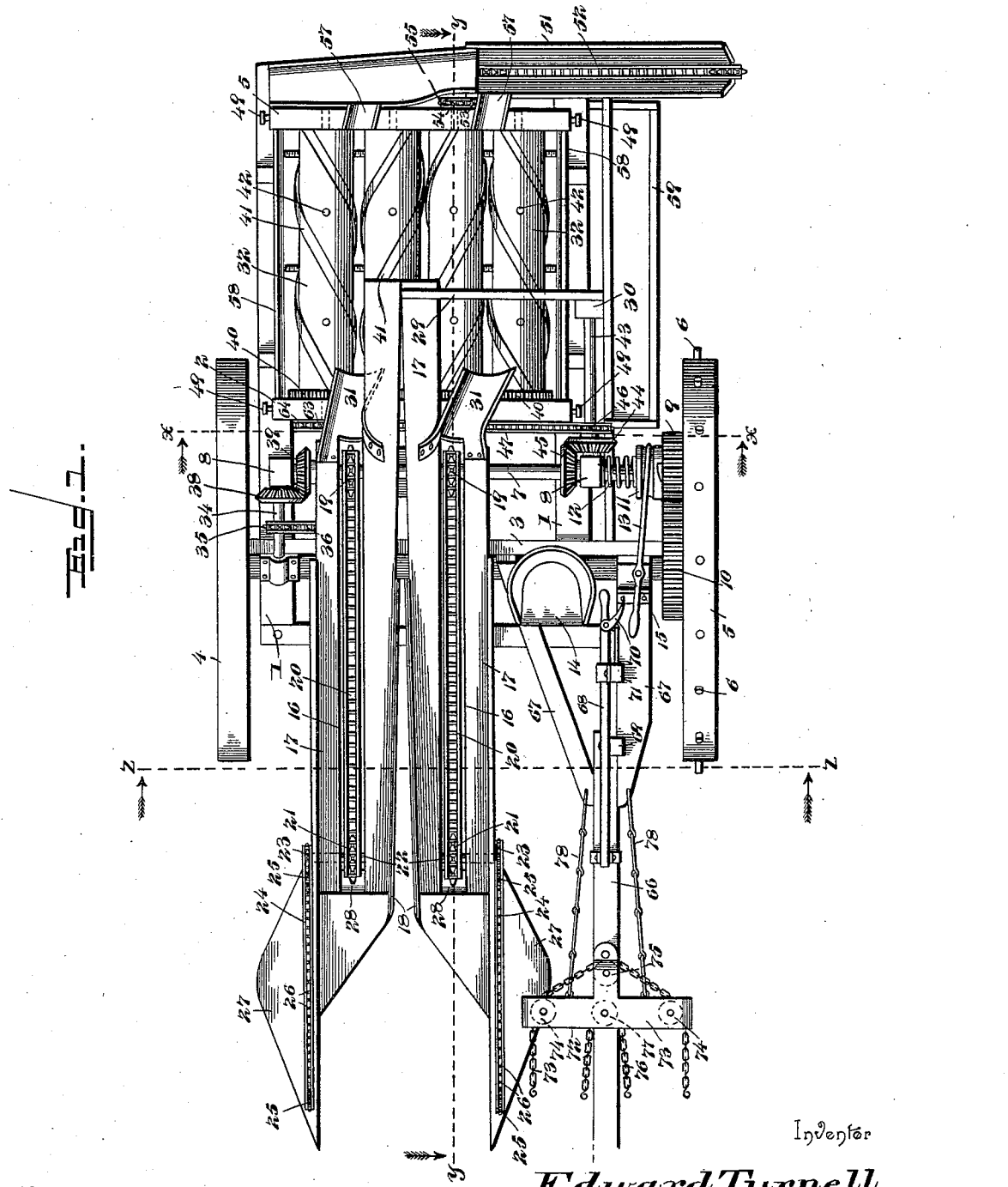
Witnesses
E. H. Stewart,
V. B. Hillyard.
By his Attorneys
C. A. Snow & Co.
Inventor
Edward Turnell (No Model.) 4 Sheets—Sheet 2.
E. TURNELL.
CORN PICKER AND HUSKER.
No. 596,192. Patented Dec. 28, 1897.
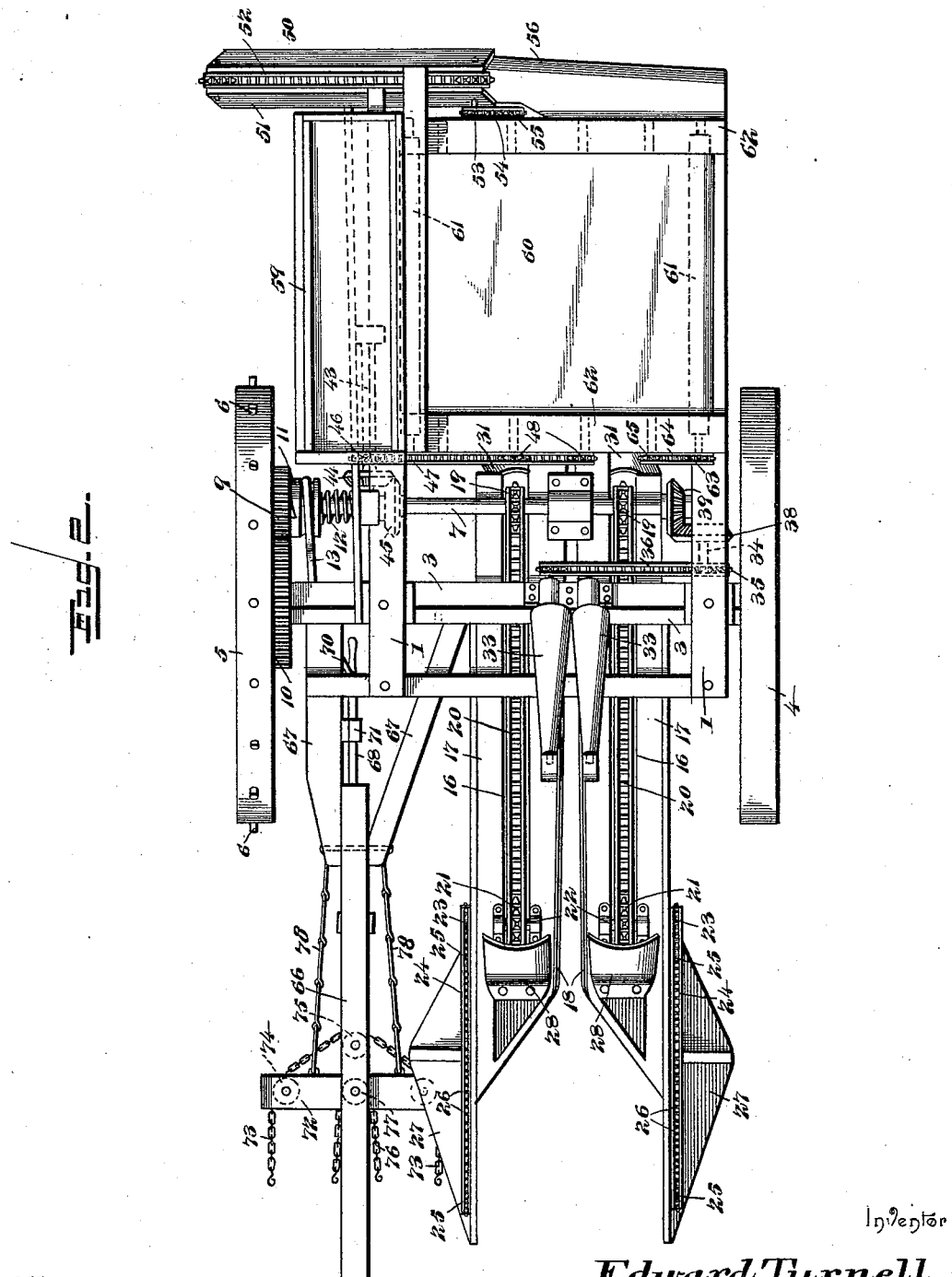
Witnesses
E. N. Stewart
V. B. Hillyard
Inventor
Edward Turnell
By his Attorneys
C. A. Snow & Co.

(No Model.) 4 Sheets—Sheet 3.
E. TURNELL.
CORN PICKER AND HUSKER.
No. 596,192. Patented Dec. 28, 1897.
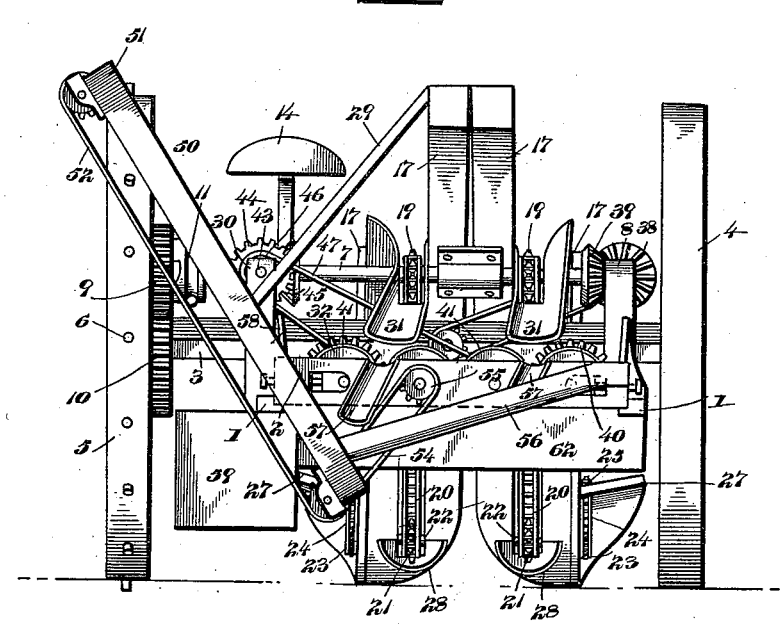
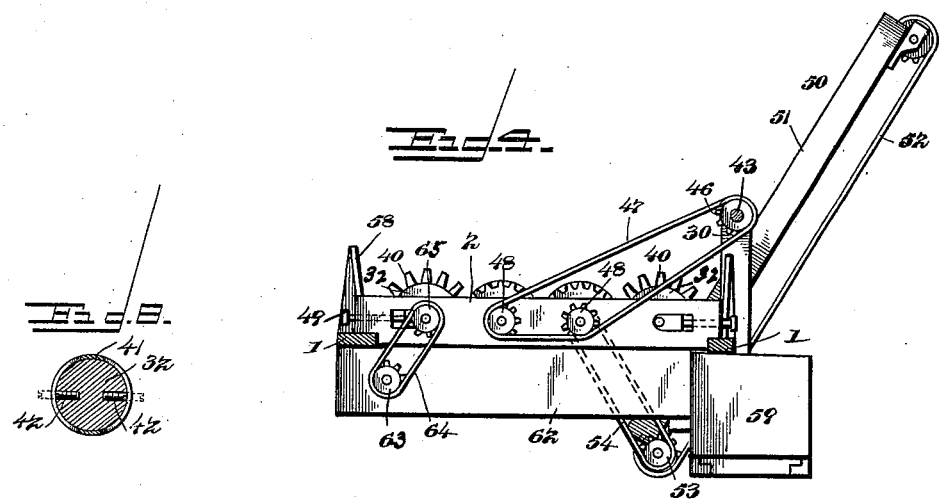
Witnesses
E. N. Stewart
V. B. Hillyard
Inventor
Edward Turnell
By his Attorneys.
C. A. Snow & Co.

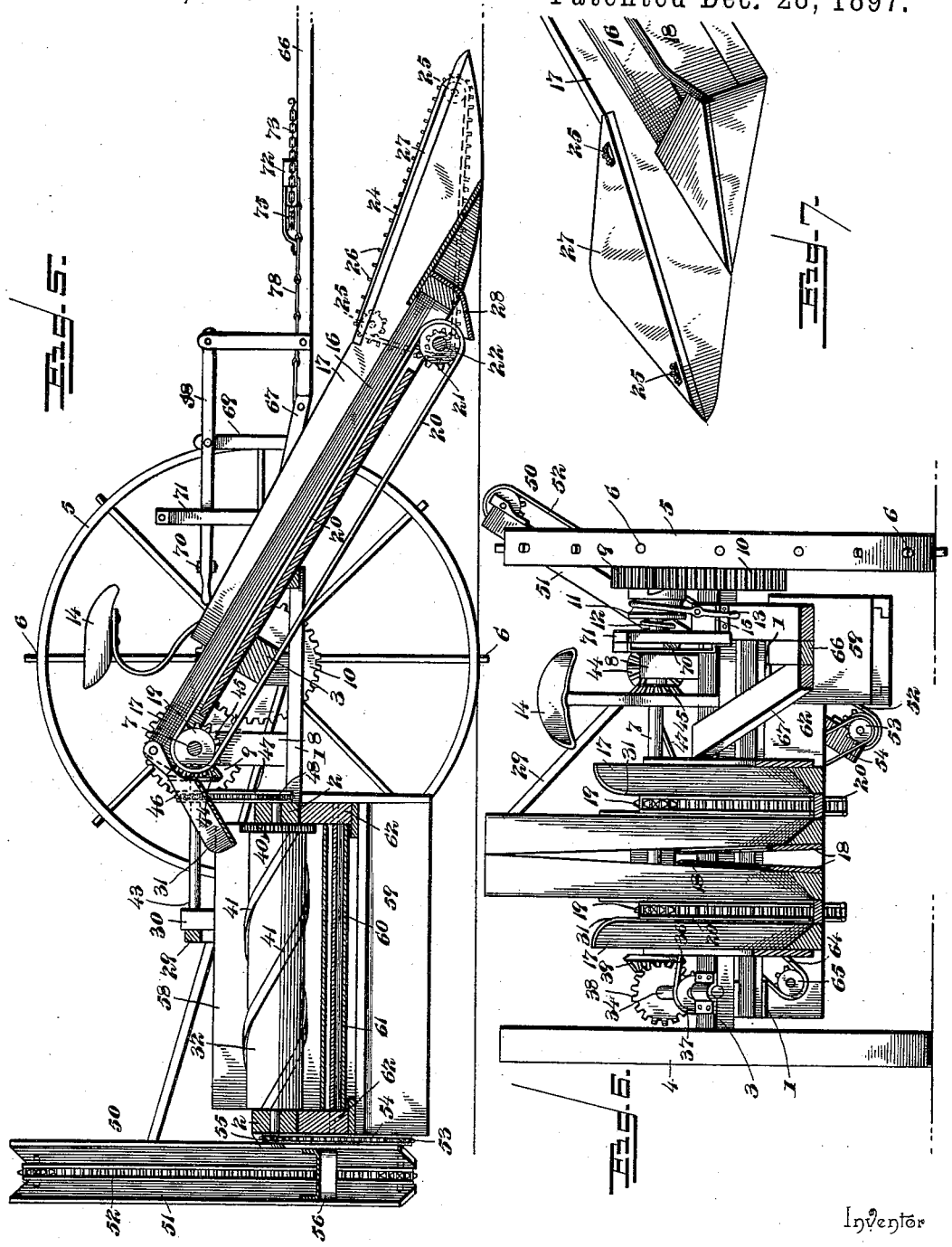

UNITED STATES PATENT OFFICE.

EDWARD TURNELL, OF ELM CREEK, NEBRASKA.

CORN PICKER AND HUSKER.

SPECIFICATION forming part of Letters Patent No. 596,192, dated December 28, 1897.

Application filed July 9, 1895. Serial No. 555,383. (No model.)

*To all whom it may concern:*

Be it known that I, EDWARD TURNELL, a citizen of the United States, residing at Elm Creek, in the county of Buffalo and State of Nebraska, have invented a new and useful Combined Corn Picker and Husker, of which the following is a specification.

This invention relates to machinery for harvesting and husking corn; and the improvement consists of the novel features which hereinafter will be more fully set forth and claimed and which are shown in the accompanying drawings, in which—

Figure 1 is a top plan view of a harvesting-machine embodying the essence of the invention. Fig. 2 is a bottom plan view thereof. Fig. 3 is a rear elevation of the same. Fig. 4 is a cross-section on the line X X of Fig. 1, looking to the rear. Fig. 5 is a longitudinal section of the machine, about on the line Y Y of Fig. 1, looking in the direction indicated by the arrow. Fig. 6 is a cross-section of the stripper and elevator about on the line Z Z of Fig. 1. Fig. 7 is a detail view of a guard at the front end of the stripper. Fig. 8 is a detail cross-section of one of the husking-rolls to show the adjustable husking-pin screwed therein.

The framework of the machine comprises, essentially, parallel side beams 1, cross-beams 2, and an axle 3, which is secured to the side beams 1 near their front ends. The supporting-wheels 4 and 5 are loosely mounted upon the arms of the axle 3 in any of the usual ways common in the construction of agricultural implements, and the wheel 5, which will be designated as the "driving-wheel," is provided upon its tread-surface with a series of projections 6, which become embedded in the surface of the ground and cause a positive rotation of the drive-wheel as the machine is drawn over the field. A shaft 7, extending parallel with the axle 3, is journaled in standards 8, rising vertically from the side beams 1, and a pinion 9 at one end of the shaft 7 meshes with a toothed rim 10, secured upon the inner side of the drive-wheel 5. The pinion 9 is loosely mounted upon the shaft 7, and a clutch 11, placed upon the shaft 7 so as to revolve therewith and capable of movement thereon to and from the pinion 9, is provided to engage with the said pinion 9 and cause it to revolve with the shaft 7 when the machine is in gear. A spring 12, located upon the shaft 7, exerts a pressure laterally against the clutch 11, so as to hold the latter normally in engagement with the pinion 9, and a shipper-lever 13, of ordinary construction, is pivotally supported between its ends, so as to have a limited vertical and lateral movement, and has one end in engagement with the clutch 11 and its opposite end extending within convenient reach of the driver's seat 14, and a stud or casting 15 is conveniently located near the free end of the shipper-lever to engage with the latter and hold the clutch out of engagement with the pinion 9 when it is required to maintain the machine out of gear.

The stripping mechanism comprises similar trough-shaped guides 16, having guards 17 at their outer sides and longitudinal cutters 18 at their inner or adjacent sides, and these guides are spaced apart a short distance to provide a passage between their adjacent sides for the reception of the stalks in the operation of the machine. The guides 16 incline upwardly and rearwardly from their front or receiving ends, and the latter incline in opposite directions to provide a flaring mouth for the reception of the stalks and the guidance of the latter to the passage between the said guides. Sprocket-pinions 19 are provided on the shaft 7 and form a support for endless conveyers 20, which operate in the bottom of the guides 16 and serve to elevate and move the ears of corn from the front to the rear end of the machine. Similar sprocket-pinions 21 are located at the front end of the guides 16 and form supports for the endless conveyers 20, and the shafts 22 of the said pinions 21 extend beyond the outer sides of the guides 16 and receive sprocket-pinions 23, by means of which the endless elevators 24 are driven. These elevators 24 are supported upon sprocket-idlers 25 and have fingers 26, which are adapted to engage with leaning or downtrodden stalks and elevate the same, so as to facilitate their movement through the passage formed between the adjacent sides of the guides 16. The lower edges of the guards 17 are curved so as to trail upon or come close to the ground, and have laterally-extending wings 27 at their front ends and which form supports for the sprocket-idlers 25 and the endless elevators 24. Fenders 28 are disposed upon the under sides of the guides 16 in advance of the sprocket-pinions 21 and serve to protect the latter and the endless conveyers 20 from injurious contact with stones, rubbish, and other foreign matter. The inner side bars of the guides 16 project to the rear of the shaft 7 and are secured together in any desired manner and are braced by an oblique stay 29, which extends to a post 30 in the rear of the contiguous standard 8. Similar chutes 31 are applied to the inner or delivery ends of the guides 16 and direct the ears of corn into the space between the pairs of husking-rollers 32.

A pair of rollers are located beneath the guides 16, one being provided for each guide, and these rollers taper in their length and have their rear portions brought together and are designed to prevent the stalks from choking the passage between the guides 16. It must be remembered that in the operation of machines of this character the stalks are frequently pulled up by the roots, and if no provision were had for removing the same the machine would soon choke and would have to be stopped and have the obstructing stalks removed. By the provision of the clearing-rollers 33 the uprooted stalks are prevented from remaining in the passage between the guides and are removed by being caught between the oppositely-revolving clearing-rollers 33. A short shaft 34 is located at one side of the machine, and a sprocket-pinion 35 thereon is connected by means of a sprocket-chain 36 with a sprocket-pinion 37 on a journal of one of the clearing-rollers 33 and by means of which the latter are positively rotated. A bevel-pinion 38 at the rear end of the shaft 34 meshes with a corresponding bevel-pinion 39, near the end of the shaft 7, and by this means the shaft 34 receives its motion from the main shaft 7.

Pairs of husking-rollers 32 are journaled in the cross-beams 2, and are caused to revolve together by means of long-toothed gear-wheels 40, and are provided with spirally-arranged strips of rubber or other elastic material 41, which are designed to grasp the husks and remove the same from the ears of corn, said strips enabling the husking-rollers to obtain a firm grip upon the husks. Husking-teeth 42 are inserted in the surface of the husking-rollers, and these teeth are screw-threaded at their inner ends, as shown by the detail view Fig. 8, and are constructed to be turned so as to bring the ends of the teeth about flush with the surface of the husking-rollers, or to have the said ends project more or less from said surface when it is required to utilize the teeth to supplement the action of the elastic strips 41. When husking dry or seasoned ears of corn, it is desired not to have the husking-teeth project, as they are liable to remove the grains of corn from the cob. Hence the advantage of having the teeth screw into the husking-rollers. When husking ears of corn which are not cured, the said teeth are caused to project more or less, so as to facilitate the husking process. A shaft 43 is journaled in the post 30 and the adjacent standard 8 and is provided with a bevel-pinion 44, which meshes with a corresponding bevel-pinion 45, secured upon the shaft 7, and a sprocket-pinion 46 on the said shaft 43 receives a sprocket-chain 47, which engages with sprocket-pinions 48 on the extended journals of two of the husking-rollers 32, so as to drive the latter. The outer husking-rollers have their journals mounted in adjustable bearings of the cross-beams 2, and set-screws 49 are provided for adjusting the said bearings, whereby the distance apart of the pairs of husking-rollers can be regulated as desired.

An elevator 50 is located at the rear end of the machine, and its purpose is to receive the ears of corn and deposit the latter into a wagon running alongside of the machine or into a suitably-placed receptacle. This elevator is of ordinary construction and comprises a frame 51 and an endless conveyer 52, the latter passing around rotary supports at the end of the said frame. The shaft of the lower rotary support is provided with a sprocket-pinion 53, which is connected by means of a sprocket-chain 54 with a corresponding sprocket-pinion 55 on an extension of a journal of one of the husking-rollers. A trough 56 is located in the rear of the husking-rollers 32 and is designed to receive the ears of corn and direct the latter to the elevator 50. Chutes 57, supported upon the rear cross-beam 2 and located opposite the space between the pairs of husking-rollers, receive the ears of corn from the latter and direct them into the trough 56. Side pieces 58 extend vertically from the side beams 1 and come opposite the husking-rollers 32 and prevent the ears of corn from passing over the side beams 1 and dropping upon the ground.

In some instances it is preferred to save and gather the husks, and for this purpose a box or receptacle 59 is located at one side of the machine, and an endless apron 60 is disposed beneath the husking-rollers and receives the husks and conveys them into the box or receptacle 59. This endless apron is supported upon rollers 61, which are journaled in bars 62, and one of the rollers 61 has its journal extended and supplied with a sprocket-pinion 63, which is connected by means of a sprocket-chain 64 with a sprocket-pinion 65 on an extended journal of one of the husking-rollers 32.

The pole or tongue 66 is pivoted at its inner end between the front ends of the hounds 67, and its front end is raised and lowered by means of a lever 68, fulcrumed upon a post 69, rising vertically from one of the hounds 67, and a hand-latch 70, carried by the lever 68, is adapted to engage with a series of openings in a vertical extension 71, contiguous to the post 69, so as to hold the said lever in the required position, thereby maintaining the front end of the stripper at the required adjusted elevation. An equalizing-bar 72 has pivotal connection midway of its ends with the pole, and a draft-chain 73 passes over pulleys 74 at the extremities of the said equalizing-bar 72 and over a pulley 75 in the rear of the said equalizing-bar. The team is adapted to be hitched to the ends of the draft-chain 73. A second draft-chain 76 passes around a pulley 77, mounted concentric with the pivot of the equalizing-bar 72. Linked bars 78 connect the hounds with the end portions of the equalizing-bar and serve to maintain the latter in proper position.

In the operation of the machine the latter is drawn over the field in such a manner that the row of stalks will pass between the knives or cutters 18, which latter will sever the ears from the stalks, and the ears falling into the guides 16 will be moved upwardly and rearwardly by the endless conveyers 20 and be deposited upon the husking-rollers, which latter will grip the husks and tear the same from the ears, and the latter moving to the rear of the husking-rollers will drop into the trough 56 and be carried by the elevator 50 into the wagon or receptacle placed or provided for the reception of the said ears.

Various changes in the form, proportion, and the minor details of construction may be resorted to without departing from the principle or sacrificing any of the advantages of this invention.

Having thus described the invention, what is claimed as new is—

1. In a corn-harvester, the combination of a pair of upwardly-inclined parallel trough-shaped guides having a tapering passage formed between them, and having their front ends oppositely inclining to provide a flaring mouth, guards applied to the outer sides of the guides and having their front ends extending forwardly thereof and made rounding at their lower edges to run upon the ground, laterally-extending wings at the front ends of the guards, sprocket-idlers at the ends of the wings in the plane thereof, endless elevators supported at their front ends upon the sprocket-idlers and located exterior to the front ends of the said guards, endless conveyers operating in the aforesaid guides, transverse shafts at the lower ends of the guides having sprocket-pinions for supporting the endless elevators and conveyers, and fenders for protecting the front ends of the endless conveyers and secured to the lower ends of the guides, substantially as specified.

2. In a corn-harvester, the combination of a pair of upwardly-inclined trough-shaped guides having their lower, forward ends inclined laterally to form a flaring mouth, the longitudinal cutters attached to the adjacent edges of said guides, and arranged in inclined relation, to each other to form a longitudinally-tapering opening or passage between said cutters, the guards attached rigidly to said guides, on opposite sides of the flaring mouth at the lower end thereof, and extending forward beyond said guides, the conveyers forming the bottoms of said trough-shaped guides, a shaft at the upper ends of said guides to support and drive the conveyers, other transverse shafts at the lower ends of said conveyers to be driven thereby, and toothed elevator-chains arranged longitudinally of the guides, out of line with the conveyers, and having their rear ends driven by the transverse shafts and supported by idler-pinions which are located at the forward ends of the guides, substantially as described.

3. In a corn-harvester, the upwardly-inclined trough-shaped guides provided, at their lower ends, with the reversely-inclined opposing faces, forming a flaring mouth to the space between the contiguous inner edges to said guides, and the guards disposed on opposite sides the medial line between said trough-shaped guides and projecting forwardly beyond the flaring mouth formed by the lower ends of said guides, combined with the longitudinal cutters fastened to the inner adjacent edges of the trough-shaped guides, in slightly-inclined relation to each other, and extending from the flaring mouth to the upper rear discharge end thereof, sprocket-wheels 19 on a transverse shaft, short transverse shafts 22 journaled in the guides near their lower, front ends, endless conveyers passing around the sprocket-wheels 19 and similar sprockets on the transverse shafts 22, idler-sprockets 25, carried by the guards, and endless toothed elevators operating around said guards, adjacent to the inner opposing faces thereof, and out of alinement with the conveyers, and passing around the idler-sprockets on the guards and other sprockets on the shafts 22 to be driven thereby, as and for the purposes set forth.

4. In a corn-harvester, the combination with upwardly-inclined trough-shaped guides carrying cutter devices and disposed in close inclined relation to form a longitudinally-tapered opening or passage, and endless conveyers operating in said trough-shaped guides, of a shaft 7 which supports one end of, and drives, said conveyers, two pairs of horizontal husking-rolls arranged in close relation to, and on a plane below, the rear discharge ends of said guides and the endless elevators, and each pair of husking-rolls arranged on one side of the medial line of said trough-shaped guides, chutes supported by said rear ends of the guides and inclined stubbleward therefrom, and toward, the pairs of husking-rolls to direct the ears of corn in opposite directions from the guides and conveyers, toward and between the respective pairs of husking-rolls, and direct gearing between said shaft, 7, and the pairs of husking-rolls to drive the latter, as and for the purposes described.

5. In a corn-harvester, the combination with upwardly-inclined trough-shaped guides provided with longitudinal cutters, and endless conveyers operating therein, of a transverse driving-shaft, 7, two pairs of husking-rolls arranged longitudinally and horizontally within the machine-frame, in rear of said upwardly-inclined guides, and in a horizontal plane below, the rear discharge ends of said guides and the conveyers therein, downwardly-inclined chutes carried by the troughs and inclined toward the respective pairs of husking-rolls, a counter-shaft, 43, geared to the shaft, 7, a single sprocket-chain driven by the counter-shaft, 43, and geared to the pairs of husking-rolls to rotate in opposite directions the respective members of each pair of husking-rolls, a transverse trough in rear of the husking-rolls, and an upwardly-inclined elevator to receive from said trough and geared to one of the husking-rolls to be driven thereby, as and for the purposes described.

In testimony that I claim the foregoing as my own I have hereto affixed my signature in the presence of two witnesses.

EDWARD TURNELL.

Witnesses:
HENRY TURNELL,
JAMES LAYCOCK.